United States Patent [19]

Caffarel et al.

[11] 4,104,186

[45] Aug. 1, 1978

[54] ORGANOSILICON ANTI-FOAMING COMPOSITIONS

[75] Inventors: Jean-Claude Caffarel, Decines; Bernard Papillon, La Mulatiere, both of France

[73] Assignee: Rhone-Poulenc Industries, Paris, France

[21] Appl. No.: 794,522

[22] Filed: May 6, 1977

[30] Foreign Application Priority Data

May 11, 1976 [FR] France ............................... 76 14094

[51] Int. Cl.² ............................................. C11D 3/065
[52] U.S. Cl. .................................. 252/89 R; 252/90; 252/321; 252/358; 252/135; 252/531; 252/539
[58] Field of Search .................. 252/321, 358, 89, 90, 252/, 531, 539, 135; 260/46.5 R

[56] References Cited

U.S. PATENT DOCUMENTS

| 3,666,681 | 5/1972 | Keil | 252/358 |
| 3,691,091 | 9/1972 | Koerner | 252/321 X |
| 3,773,685 | 11/1973 | Schrader | 252/358 |
| 3,933,672 | 1/1976 | Bartolotta et al. | 252/321 X |

*Primary Examiner*—Benjamin R. Padgett
*Assistant Examiner*—E. Suzanne Parr
*Attorney, Agent, or Firm*—Bacon & Thomas

[57] ABSTRACT

Compositions containing 2% to 50% of organosilicon anti-foaming agents and 98% to 50% of powdered solid carriers having the general formula $(CH_3)_a(HO)_b(RO)_c SiO_{(4-b-b-c)}/2$ in which the symbol "$R$" represents a methyl, ethyl, n-propyl, isopropyl or n-butyl, the symbol "$a$" represents any number ranging from about 0.8 to about 1.1, the symbol "$b$" represents any number ranging from about 0.002 to about 0.2 and the symbol "$c$" represents any number ranging from about 0 to about 0.2. The compositions are used to reduce the foaming effects of surfactants in liquids. The anti-foaming compositions of the invention can be added to powdered detergents and will remain effective for extended periods of time.

12 Claims, No Drawings

ORGANOSILICON ANTI-FOAMING COMPOSITIONS

BACKGROUND OF THE INVENTION

1. Field of the Invention

The present invention relates to new powdered organosilicon anti-foaming compositions which are made by mixing organosilicon anti-foaming agents with solid organopolysiloxane carriers. The compositions can be used for treating aqueous solutions containing detergents.

The invention also relates to a process for maintaining the anti-foam activity of organosilicon anti-foaming agents which are stored in contact with washing powders by introducing the anti-foaming agents into the washing powders in combination with the disclosed organopolysiloxane carriers.

2. Description of the Prior Art

Published German Application No. 1,519,964 teaches preparing powdered anti-foaming compositions, which may be used in detergent solution, by mixing silicone oils with adsorbent materials such as urea, zeolites and silica gels, preferably in a solvent medium. While such compositions have an effective anti-foaming activity, they rapidly lose this activity when they are brought into prolonged contact with powdered detergents. Therefore, the anti-foaming agents cannot be packaged together with detergents and yet still remain effective.

Published French Application No. 2,194,771 teaches a method of safeguarding the anti-foaming activity of the usual organosilicon anti-foaming agents which are mixed with washing powders and then stored. The anti-foaming agents are coated with synthetic or organic matrices whch are solid at ambient temperature and which are water-soluble or dispersible. The coating technique consists of mixing the melted matrices with the anti-foaming agents and then spraying the mixture into a fluidized bed of a water-soluble solid material. This technique is unnecessarily complicated. Moreover, since the anti-foaming agents may exist in various physical states (liquids, pastes or solids) it is not always possible to readily obtain homogeneous and dry coatings.

French Pat. No. 2,084,632 discloses an anti-foaming composition made of four different materials, i.e., (1) an organic liquid which is insoluble in water, (2) a hydroxylated dimethylpolysiloxane oil or an organopolysiloxane resin which is soluble in benzene, (3) a silica or methylsilsesquioxane gel filler, and (4) an amino compound, an alkali metal hydroxide or an alkaline earth metal hydroxide.

Belgian Pat. No. 826,633 teaches a combination of three organosilicons which are combined with mineral oils. The preferred organosilicon mixture is made of (1) 55–96% by weight of a siloxane having the formula

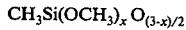

in which "x" has a value such that the methoxy radical is present in a weight percentage of 10%–35% by weight, (2) 2%–25% by weight of a copolymer made of $(CH_3)_3SiO_{0.5}$ and $SiO_2$ which is soluble in benzene and in which the ratio of $(CH_3)_3SiO_{0.5}$ to $SiO_2$ is between 0.5:1 and 1.2:1, and (3) 2%–25% of a methylpolysiloxane fluid having hydroxyl end groups which are attached to silicon.

Thus, there remains a need in the art for a simple yet effective means of protecting and maintaining the anti-foaming properties of organosilicons which will subsequently be added to detergents.

SUMMARY OF THE INVENTION

Accordingly, it is an object of the present invention to provide a new anti-foaming composition which will keep its anti-foaming activity even when mixed with a detergent and then stored.

Another object of the invention is to provide an anti-foaming composition which may be added to systems where foaming is likely to occur, so as to effectively minimize foaming.

It has now been discovered that it is not necessary to pre-coat the organosilicon anti-foaming agents which will be added to detergents with matrices to safeguard their anti-foaming activity. In effect, it is sufficient to simply mix these anti-foaming agents with solid organopolysiloxane carriers, which have no anti-foaming effect and which are derived primarily from the hydrolysis of methylchlorosilanes and/or methylalkoxysilanes.

DETAILED DESCRIPTION OF THE INVENTION

The present invention, therefore, relates to improved anti-foaming compositions which contain: (the percentages being expressed by weight)

A. about 2 to about 50% of organosilicon anti-foaming agents and

B. about 98 to about 50% of pulverulent solid carriers, which of themselves have no anti-foaming activity, and which are chosen from among the organosilicon polymers of the formula F:

in which the symbol "R" represents a methyl, ethyl, n-propyl, isopropyl or n-butyl radical, the symbol "a" represents any number ranging from about 0.8 to about 1.1, the symbol "b" represents any number ranging from about 0.002 to about 0.2 and the symbol "c" represents any number ranging from about 0 to about 0.2.

While French Pat. No. 2,084,632 discloses anti-foaming compositions which may be used with aqueous systems, each of these compositions consists of (1) an organic liquid which is insoluble in water, (2) a hydroxylated dimethylpolysiloxane oil or an organopolysiloxane resin which is soluble in benzene, (3) a silica or methylsilsesquioxane gel filler, and (4) an amino compound, an alkali metal hydroxide or an alkaline earth metal hydroxide. Significantly, this patent fails to disclose that mixtures of the oil or the organosilicon resin (2) with the methylsilsesquioxane gel (3) alone possess anti-foaming properties which are retained when brought into contact with detergent powders.

Anti-foaming agents (A) may be any organosilicon compound which is effective in eliminating or controlling the formation of foams in aqueous media. Agents of this type are well known and they may comprise, for example:

Diorganopolysiloxane polymers generally mixed with siliceous fillers, which may or may not be treated with organosilicon compounds as illustrated by French Pat. Nos. 1,240,061 and 1,257,811 and French Pat. No. 1,389,936, which together with its equivalent U.S. Pat. No. 3,383,327 are all herein incorporated by reference, mixtures consisting of dimethylpolysiloxane oils, resins with $(CH_3)_3SiO_{0.5}$ and $SiO_2$ units, and silica aerogels as illustrated by French Pat. No. 1,511,444 and British patent specification No. 1,110,207, the disclosures of which are hereby incorporated by reference, and copolymers possessing organopolysiloxane blocks and polyoxyalkylene blocks, mixed with finely divided silicas as illustrated by French Application No. 2,088,522 and German Pat. No. 2,123,573, the disclosures of which are hereby incorporated by reference.

According to the present invention, the preferred anti-foaming agents used are diorganopolysiloxane polymers which may or may not be mixed with finely divided silicas. More specifically preferred are diorganopolysiloxane polymers which correspond to the formula F': $R'(R''_2SiO)_n SiR''_2 R'$, in which the symbols "R'", which may be identical or different, represent hydroxyl radicals, alkoxy radicals having 1 to 4 carbon atoms, or methyl or vinyl radicals, the symbols "R''", which may be identical or different, represent methyl, ethyl, n-propyl, vinyl or phenyl radicals, wherein at least about 80% of all the radicals represented by the symbols R' and R'' are methyl radicals, and the symbol "$n$" represents any number ranging from about 20 to 10,000.

The polymers of the formula F' can be blocked at each end of their chain by hydroxyl radicals or alkoxy radicals such as methoxy, ethoxy, n-propoxy, isopropoxy, n-butoxy or tertbutoxy radicals. Additionally, triorganosiloxy units such as those of the formulae $(CH_3)_3SiO_{0.5}$, $(CH_3)_2CH=CHSiO_{0.5}$, $C_2H_5(CH_3)_2SiO_{0.5}$ and $C_6H_5(CH_3)SiO_{0.5}$ may likewise be used to block the ends of the chain.

An example of the diorganopolysiloxane polymers which may be used are dimethylpolysiloxane polymers blocked by hydroxyl and/or trimethylsiloxy groups and which have viscosities ranging from 80 cp to 1 million cp at 25° C.

The diorganopolysiloxane polymers are generally available in the silicone industry and, in addition, their preparation can easily be effected by following the methods of operation described in the published literature on the organosilicons. More precisely, the preparation of diorganopolysiloxane polymers which are blocked by triorganosiloxy groups is taught by French Pat. Nos. 978,058, 1,025,150 and 1,108,764, the disclosures of which are herein incorporated by reference; the preparation of diorganopolysiloxane polymers which are blocked by hydroxyl groups is explained and taught by French Pat. Nos. 1,134,005, 1,198,749, 1,276,619 and 1,278,281, the disclosures of each being herein incorporated by reference; and the preparation of diorganopolysiloxane polymers which are blocked by alkoxy groups is taught by French Pat. Nos. 938,292 and 1,116,196, the disclosures of each also being herein incorporated by reference.

In order to obtain diorganopolysiloxane polymers having the desired viscosities, it is possible to use a mixture of polymers with very different viscosities. For example, when 50 parts of an α-ω-bis-(trimethylsiloxy)-dimethylpolysiloxane rubber, having a viscosity of 20 million cp. at 25° C., is mixed with 100 parts of an α-ω-bis-(trimethylsiloxy)dimethylpolysiloxane oil, having a viscosity of 50,000 cp. at 25° C., 150 parts of a homogeneous mixture are obtained which has a viscosity of about 800,000 cp. at 25° C.

The quantities of finely divided silicas, which are optionally combined with the diorganopolysiloxane polymers, represent, at most, about 20% of the polymer/silica mixtures, and preferably from 2 to 18%.

These silicas comprise the conventional pyrogenic and precipitated silicas, aerogels and xerogels. Such fillers are manufactured on an industrial scale, they have a specific surface area greater than 80 $m^2/g$ and the average diameter of their elementary particles is generally in the range of 0.002 to 0.1 micron. These fillers can be treated with organosilicon compounds chosen from among organochlorosilanes, cyclic organopolysiloxanes, which may be straight-chained or branched, hexaalkyldisilazanes and organopolysilazanes disclosed by French Pat. Nos. 1,036,777, 1,136,885, 1,136,884, 1,234,245, 1,236,505 and British patent specification No. 1,024,234, the disclosures of each being herein incorporated by reference.

Other anti-foaming agents can also be used according to the invention. For example, liquid, branched methylpolysiloxane polymers, having from about 1.6 to about 1.98 methyl radicals per silicon atom, which consist of a combination of units chosen from the group having the formulae: $(CH_3)_3SiO_{0.5}$, $(CH_3)_2SiO$ and $CH_3SiO_{1.5}$. These polymers contain from about 0.3 to about 10% of hydroxyl groups; they can be obtained by hydrolysis of the corresponding methylchlorosilanes, as shown in French Pat. No. 1,408,662, the disclosure of which is incorporated herein.

The preparation of the solid carriers (B) can be carried out by a simple hydrolysis of methylchlorosilanes using an excess quantity of water relative to the number of gram-atoms of chlorine to be hydrolyzed; it is convenient to use from 5 to 25 mols of water per gram-atom of chlorine which is bound to a silicon atom. The methylchlorosilanes employed are chosen from the group consisting of silicon tetrachloride, methyltrichlorosilane and dimethyldichlorosilane. It is possible to use, for example, a mixture of silicon tetrachloride and methyltrichlorosilane, a mixture of methyltrichlorosilane and dimethyldichlorosilane, a mixture of silicon tetrachloride, methyltrichlorosilane and dimethyldichlorosilane, or methyltrichlorosilane alone. The molar quantities of chlorosilanes present in each mixture are controlled so as to have a molar ratio of the number of methyl radicals to the number of silicon atoms ranging from about 0.8:1 to about 1.1:1.

During each hydrolysis, a solid white compound precipitates, which is filtered off. This compound is thoroughly washed so as to remove the residual acidity and then it is dried. When dried, it has the appearance of a white powder which consists of adsorbed water and the solid carrier B, this carrier corresponding to the above-mentioned formula F in which the symbol "$c$" has the value of zero.

A large portion of the contained water is removed by simple drying of each solid compound in a heated oven at about 70°–200° C. for a period of, for example, at least 30 minutes. It is thus possible to prepare solid carriers (B) which contain only hydroxyl groups and no OR groups.

The hydrolysis of the methylchlorosilanes can be carried out by a discontinuous or a continuous process; to carry out the continuous process it is possible to introduce these silanes into a circulation system analogous to that described in French Pat. No. 1,077,230 which is herein incorporated by reference. This system consists of a pipe circuit onto which are connected the inlet for the methylchlorosilanes and the inlet for the water, which may be pure or acidified with hydrochloric acid. Additionally, the body of the circuit comprises a pump which ensures the circulation of the reagents and of the hydrolyzed products and a heat exchanger. The suspension of solid compounds within the acidic circulating liquor is removed by means of overflow and the solid compounds can then subsequently be treated, as described above, in order to isolate the carriers (B) of the formula F, in which the symbol "c" has the value of zero.

To prepare solid carriers (B) corresponding to the formula F, with the symbol "c" having a value other than zero, it is necessary to add an alcohol of the formula ROH to the hydrolysis liquor in the proportion of no more than 0.3 mol per mol of water employed. The alcohol used is chosen from the group consisting of methanol, ethanol, propanol, isopropanol and normal butanol. Solid carriers of this type can also be prepared by hydrolysis of methylalkoxysilanes derived from methylchlorosilanes which have been reacted with alcohols of the formula ROH.

In addition, the preparation of solid carriers of the formula F, in which the symbol "R" represents only the methyl group and the symbol "c" represents a number other than zero, can be effected by a methanolysis of methylchlorosilanes. In such a case the silanes are treated, while hot, with methanol which reacts with the SiCl bonds to form primarily Si—O—Si bonds with methyl chloride being formed concomitantly as is illustrated by French Pat. No. 945,792, and whose disclosure is herein incorporated by reference. Preferably, a large molar excess of methanol is used relative to the number of gram-atoms of chlorine present in the reaction mixture, for example, an excess of 5 to 30 times the amount necessary. The solid compounds precipitate while the methyl chloride is evolved. When this evolution has finished the solid compounds are filtered off, washed thoroughly with water and then dried in an oven to obtain the solid carriers (B).

No matter which technique is used, the solid compounds obtained occur in the form of homogeneous, granular white powders. These powders contain about 10 to about 65% and preferably 12 to 60% of water, and about 90 to about 35% and preferably 88 to 40% of solid carriers (B) of the formula F mentioned above,

$(CH_3)_a(HO)_b(RO)_cSiO_{(4-a-b-c/2)}$ in which the symbol "R" can represent a methyl, ethyl, n-propyl, isopropyl, or n-butyl radical, but which is preferably a methyl radical, the symbol "a" represents any number ranging from about 0.8 to about 1.1 and preferably from 0.85 to 1.05, the symbol "b" represents any number ranging from about 0.002 to about 0.2 and preferably from 0.003 to 0.15 and the symbol "c" represents any number ranging from about 0 to about 0.2 and preferably from 0 to 0.15.

As previously indicated, the solid compounds can be dehydrated to form the solid carriers by heating at about 70°–200° C. and preferably 80°–180° C., for a period of time which of course depends on the temperature used and on the concentration of water present in the solid compounds. Generally, this period ranges from about 30 minutes to 12 hours.

These carriers (B) which contain, at the most, 5% water are granular powders having average particle diameters which are substantially in the range between about 10 microns and about 1,000 microns. The carriers (B) which correspond to the formula F, with the symbol "c" having the value of zero, are generally non-fusable. On the other hand, when the symbol "c" is not equal to zero, the carriers (B), can have melting points of less than 150° C. These melting points depend on the nature of the alkoxy group, OR, and on the value of "c". Generally, the compounds do not melt below 60° C.

It should be noted that the carriers (B) of the formula F, in which the symbol "c" is not equal to zero and the symbol "R" represents a methyl radical, are outside the organopolysiloxanes of the formula $CH_3(CH_3O)_xSiO_{(3-x/2)}$ described in Belgian Pat. No. 826,633. In effect, the latter are liquid, not solid, products without hydroxyl groups, which contain from 10 to 35% by weight of methoxy groups, which leads to a value for $x$ which lies substantially between 0.23 and 1.02.

The preparation of anti-foam compositions according to the invention, takes place by simple mixing of the anti-foaming agents (A) and the solid carriers (B). The carriers themselves may be mixed as they are or in the presence of water. For example, (A) and (B) may each be mixed when each is in the form of the solid compounds mentioned above.

The quantities of (A) and (B) employed are calculated so as to give anti-foaming compositions containing about 2 to about 50% and preferably 5 to 45% of the agents (A), and about 98 to about 50% and preferably 95 to 55% of the carriers (B).

(A) and (B) may be mixed in any of the known devices such as malaxaters, kneading machines and mixers equipped with stirrers which have a scraping action.

While any order of incorporation may be used, if the quantities of the agents (A) are small relative to those of the carriers (B), it is more practical to introduce the carriers (B) first and then to incorporate the agents (A) therein in small amounts.

When the carriers (B) are used as they are, and thus not mixed with water, they can simply be mixed at ambient temperature with the agents (A) to yield the compositions according to the invention. On the other hand, when the carriers (B) which are used contain water (that is to say in the form of solid compounds) their mixture with the agents (A) must be heated.

The heating takes place under conditions analogous to those indicated for isolating the carriers (B) starting from the solid compounds, i.e., heating at about 70°–200° C., for a period of at least 30 minutes, is suitable. This process has the advantage over the preceding process [using the carriers (B) as they are] of promoting a better contact between the constituents (A) and (B).

The two preceding incorporation processes give anti-foaming compositions having the same appearance: granular homogeneous dry powders in which the granules have an average particle diameter of the order of from 10 microns to 1,000 microns. These granules crumble easily, and it is thus easy to prepare finely powdered compositions with a finer average particle diameter by further grinding or sifting of the composition. Particle sizes of less than 5 microns can be achieved in this manner.

The anti-foaming compositions obtained are storage-stable and are easily dispersed in water. They can be used to eliminate or to control the formation of foams in all media which are liable to foam, for example in dyeing baths, in fermentation tanks, and in the devices which are used to evaporate the alkaline liquors derived from the treatment of paper pulp or the purification or residual liquors, or the concentration of sugar solutions.

However, the carrier-agents of this invention are particularly effective in reducing or destroying the volume of foam which is formed in aqueous washing solutions which contain surface-active substances. The solutions thus contemplated are those which occur when cleaning (manually or by machine) of clothing and of dishes.

They can be introduced into the solutions for washing, separately, or, indeed, in a mixture with detergents which contain surface-active substances.

When powdered agents, specifically detergents, are used, it is very useful, as a preliminary step, to package mixtures containing the anti-foaming compositions together with the powdered products. When so packaged, the entire mixture is confined and enclosed within a unitary package which can be sold to the consumer. This technique avoids the inconvenience of packing the two ingredients separately. In this form of mixture, the anti-foaming compositions according to the invention suprisingly exhibit the property of retaining an effective anti-foaming activity which does not change with time, which is not affected by prolonged storage, and which can be stored for periods exceeding several months at ambient temperature, for example, 6 months.

Any amounts of anti-foaming compositions may be mixed with the washing powders. Nevertheless, it is wise to use quantities which represent about 0.1 to about 10% by weight of the washing powders and preferably 0.15 to 8%. If the quantities of anti-foaming compositions to be mixed with the washing powders are low, for example less than 2%, it is advisable to pre-dilute these compositions with pulverulent solids, which are water-soluble or dispersible, and which are preferably chosen from among the inorganic products used in the formulation of washing powders, such inorganic products are for instance tripolyphosphates, sulphates of sodium or of potassium.

Anti-foaming compositions according to the invention are effective with foams produced by any type of washing powder. Generally, these powders contain about 5 to about 25% of one or more surface-active agents such as mixed sodium alkyl sulphates, mixed potassium alkyl sulphates, sodium alkylarylsulphonates, potassium alkylarylsulphonates, the condensation products of alkylphenols or of fatty alcohols with ethylene oxide, and alkali metal salts of fatty acids. The other constituents of these powders are primarily one or more inorganic products such as phosphates, tripolyphosphates, hexametaphosphates, silicates, sulphates, perborates, carbonates and bicarbonates of sodium or of potassium.

The anti-foaming compositions can, in particular, inhibit the foams produced by detergents which contain as their principle surface-active agents only compounds or mixtures of compounds which are non-ionic (polyoxyethylene alcohols or polyoxyethylene alkylphenols) and which are effective in cleaning synthetic textiles.

The anti-foaming compositions disperse easily in wash waters. Additionally, they have the advantage of becoming fixed to neither the fabrics or other materials to be washed, nor to the sides of the washing machines.

The following examples illustrate the invention:

EXAMPLE 1

An anti-foaming agent $T_1$ was prepared by grinding, for 3 hours at ambient temperature, 95 parts of an α-ω-bis-(trimethylsiloxy)dimethylpolysiloxane oil, of viscosity 500 cp. at 25° C., with 5 parts of a pyrogenic silica of specific surface area 300 m²/g, this silica having been pre-treated with octamethylcyclotetrasiloxane, according to the process recited in the U.S. Pat. No. 3,085,905.

10 parts of this anti-foaming agent $T_1$ was then mixed, by malaxating for 15 minutes at about 25°–35° C., with 165 parts of a fluid powder which consisted substantially of 90 parts of solid carrier $P_1$, corresponding to the general formula $(CH_3)(HO)_{0.04}SiO_{1.48}$ and 75 parts of water (the preparation of this powder is described at the end of this example).

This mixture was then left for 4 hours in a ventilated oven maintained at 110° C. At the end of this drying period about 100 parts of an anti-foaming composition $T'_1$ remained, which had the appearance of a dry granular powder.

2% of the composition $T'_1$ (this percentage corresponded to 0.2% of the anti-foaming agent $T_1$ and to 1.8% of the solid carrier $P_1$) was incorporated into a batch of washing powder. At the same time, only 0.2% of the anti-foaming agent $T_1$ was incorporated into a second batch and 1.8% of the solid carrier $P_1$ was incorporated into a third batch (to isolate the carrier $P_1$ from the precipitated fluid powder, the latter was heated for 3 hours in an oven maintained at 110° C.; the carrier $P_1$ which was thus collected contained about 3% of water).

Each modified batch was divided into two fractions, the first fraction was used immediately and the second fraction was used after storage for one month in a closed container maintained at 40° C.

The detergent powder was prepared just prior to use by mixing 25 parts of sodium perborate tetrahydrate with 75 parts of an atomised powder which contained substantially the following percentages of ingredients:

| | |
|---|---|
| Sodium silicate (molar ratio $SiO_2:Na_2O = 2$) | 6.6 |
| Sodium tripolyphosphate | 46.7 |
| Sodium sulphate | 17.3 |
| Sodium n-dodecylbenzene sulphonate | 12 |
| Sodium salts of hydrogenated tallow fatty acids | 6.7 |
| Polyoxyethylene fatty alcohol (obtained by the condensation of 1 mol of an alcohol, having an average of 12 carbon atoms, with 9 mols of ethylene oxide) | 5.3 |
| Carboxymethylcellulose | 1.4 |
| Water | 4 |

Each batch fraction was then introduced into a washing machine equipped with a drum, at the rate of 8 g per liter of washing water (which water had a hardness of 33 French degrees of hardness). The washing machine had a circular front opening with a diameter of 22 cm, and it could carry a wash load of 4 kg. It exhibited the following characteristics:

Its washing cycle made it possible to attain a temperature of 40° C. after operatng for 8 minutes and a temperature of 80° C. after 30 minutes;

the washing cycle lasted 55 minutes and was followed by a rinsing cycle and a drying cycle; and the periods of agitation with the horizontal drum lasted 5 seconds and they were separated by rest periods of 10 seconds.

The drum was filled with 1 kg of material to be washed which was made of cotton.

In order to determine the activity of the various batch fractions, the foam heights at the opening were measured after 8 minutes and after 30 minutes of operating each cycle. The results of the measurements are assembled in Table 1 below:

TABLE 1

| Batch fractions used immediately, i.e., new, and after storage for one month at 40° C., i.e., aged. | | Foam height in cm, measured after: | |
|---|---|---|---|
| | | 8 minutes | 30 minutes |
| Batch modified with $T_1$ | (new fraction) | 4 | 3 |
| | (aged fraction) | 12 | >22 |
| Batch modified with $P_1$ | (new fraction) | 12 | >22 |
| | (aged fraction) | 12 | >22 |
| Batch modified with $T'_1$ | (new fraction) | 4 | 3 |
| | (aged fraction) | 4 | 3 |

From these results it is clearly seen:
1. That the anti-foaming activity of the anti-foaming agent $T_1$ is not retained if this agent is left mixed with the detergent powder;
2. That the carrier $P_1$ itself has no anti-foaming activity; and
3. That only the composition $T'_1$ (obtained by mixing $T_1$ and $P_1$) remains effective after storage for 1 month at 40° C. with the washing powder The fluid powder, containing the solid carrier $P_1$, was prepared as follows:

A 2500 liter vessel, equipped with a stirrer, was first charged with 1800 liters of water. The stirrer was started and adjusted to a speed of 20 rpm. 270 kg of methyltrichlorosilane were then introduced into the vessel over a period of 4 hours. The agitation was maintained for 4 hours after which the contents were filtered through a porcelain Buchner funnel provided with a polyvinyl chloride fabric (during the filtration, the funnel was connected to a vacuum pump which provided a pressure of 100 mm of mercury).

The powder retained on the filter was washed directly with water until the acidity due to the hydrochloric acid had almost disappeared. Analysis of this powder showed that it consisted substantially of 55% of the above-mentioned solid carrier $P_1$ of the formula $CH_3(HO)_{0.04}SiO_{1.48}$ and 45% of water.

EXAMPLE 2

An anti-foaming agent $T_2$ was prepared by grinding 93 parts of an α-ω-bis-(trimethylsiloxy)dimethylpolysiloxane oil, of viscosity 100 cp. at 25° C. for 16 hours at 150° C. with 7 parts of pyrogenic silica, having a specific surface area 300 m²/g. This silica had been pre-treated with octamethylcyclotetrasiloxane.

40 parts of this agent, $T_2$, were then mixed, by malaxating for 10 minutes at about 20° C., with 60 parts of a solid carrier $P_2$ which corresponds to the general formula $CH_3(HO)_{0.004}(CH_3O)_{0.07}SiO_{1.46}$ (the preparation of this carrier will be described at the end of the example). The anti-foaming composition $T'_2$ obtained has the appearance of a granular homogeneous powder.

0.5% of the composition $T'_2$ (this percentage corresponds to 0.2% of the anti-foaming agent $T_2$ and to 0.3% of the carrier $P_2$) was then incorporated into a batch of detergent powder; at the same time, 0.2% of the anti-foaming agent $T_2$ was incorporated into a second batch of the same powder and 0.3% of the carrier, $P_2$, was incorporated into a third batch. Each batch was then divided into two fractions; the first fraction was used immediately and the second fraction was used after storage for 1 month in a closed vessel maintained at 40° C.

The washing powder contains substantially the following compounds:

| | |
|---|---|
| Sodium silicate (molar ratio $SiO_2:Na_2O = 2$) | 5 parts |
| Sodium tripolyphosphate | 35 parts |
| Sodium sulphate | 38 parts |
| Sodium n-dodecylbenzene sulphonate | 9 parts |
| Sodium salts of hydrogenated tallow fatty acids | 5 parts |
| Polyoxyethylene fatty alcohol (obtained by the condensation of 1 mol of an alcohol, having an average of 12 carbon atoms, with 9 mols of ethylene oxide) | 4 parts |
| Carboxymethylcellulose | 1 part |
| Water | 3 parts |

The anti-foaming activity of the various batch fractions was examined by following the washing process indicated in Example 1 (these batch fractions were also used at the rate of 8 g per liter of washing water, which water had a hardness corresponding to 33 French degrees or 330 mg of calcium carbonate per liter).

The following results were obtained:

TABLE 2

| Batch fractions used immediately, i.e., new, and after storage for one month at 40° C., i.e., aged. | | Foam height in cm, measured after: | |
|---|---|---|---|
| | | 8 minutes | 30 minutes |
| Batch modified with $T_2$ | (new fraction) | 3 | 5 |
| | (aged fraction) | 10 | >22 |
| Batch modified with $P_2$ | (new fraction) | 10 | >22 |
| | (aged fraction) | 10 | >22 |
| Batch modified with $T'_2$ | (new fraction) | 3 | 5 |
| | (aged fraction) | 3 | 5 |

These results are similar to those noted in Example 1 and they also clearly show that:
1. The anti-foaming agent $T_2$ loses its activity on storage in a mixture with the washing powder;
2. The carrier $P_2$ has no anti-foaming activity; and
3. Only the composition $T'_2$ (a mixture of $T_2 + P_2$) retains a complete activity on storage in a mixture with the washing powder.

The solid carrier $P_2$ was prepared according to the technique below:

63 kg of methyltrichlorosilane were introduced, over a period of 3 hours, into 120 liters of methanol, which were heated under reflux and stirred. Upon the introduction of the methyltrichlorosilane, there occurred simultaneously, a brisk evolution of methyl chloride and the appearance of a whitish solid compound within the reaction mixture. After the addition of the methyltrichlorosilane was completed, the stirring was continued for 3 hours and then the excess methanol was removed by distillation. 60 liters of water were then added to the solid residue and the dispersion obtained was filtered through a porcelain Buchner funnel and the powder which was retained was washed with water until the washings were neutral. The analysis of this powder showed that it substantially consisted of 86% of the above-mentioned solid carrier $P_2$ of the formula $CH_3(HO)_{0.004}(CH_3O)_{0.07}SiO_{1.46}$ and of 14% water. The solid carrier $P_2$ was isolated by drying the powder for 2 hours in a ventiltated oven heated at 110° C. until it contained about 0.5% of water.

EXAMPLE 3

An anti-foaming agent $T_3$ was prepared by grinding 97 parts of an α-ω-bis-(trimethylsiloxy)dimethylpolysiloxane oil, of viscosity 1,000 cp at 25° C. for 5 hours at ambient temperature with 3 parts of a pyrogenic silica of specific surface area 200 m²/g.

20 parts of this agent $T_3$ were mixed, by malaxating at about 25° C. for a period of 15 minutes, with 147 parts of the fluid powder used in Example 1 (these 147 parts thus contained, substantially, 80 parts of the solid carrier $P_1$ of the formula $(CH_3)(HO)_{0.04}SiO_{1.48}$ and 67 parts of water).

The mixture obtained was left for 4 hours in an oven heated at 110° C. At the end of this drying period, about 100 parts of an anti-foaming composition $T'_3$ remains having the appearance of a homogeneous granular powder.

1.5% of the composition $T'_3$ (this percentage corresponded to 0.3% of the anti-foaming agent $T_3$ and to 1.2% of the carrier $P_1$) was incorporated into a batch of detergent powder and 0.3% of the anti-foaming agent $T_3$ alone was incorporated into another batch. Each batch was divided into two fractions; one of which was used immediately and the other after storage for 1 month at 40° C.

The washing powder was prepared in two stages:

(1) Impregnation of 68 parts of an atomized powder containing substantially the following percentages of ingredients:

| | |
|---|---|
| Sodium silicate (molar ratio $SiO_2$:$Na_2O$ = 2) | 7.4 |
| Sodium tripolyphosphate | 51.5 |
| Sodium sulphate | 33.8 |
| Water | 7.3 | by spraying with 12 parts of a polyoxyethylene fatty alcohol (obtained by condensation of one mol of an alcohol, having an average of 12 carbon atoms, with 6 mols of ethylene oxide), and (2) The addition of 20 parts of sodium perborate tetrahydrate to the mixture of (1) just before the powder was used.

This powder had the characteristic of not containing ionic surface-active substances.

Each batch fraction was then introduced into a washing machine at a rate of 10 g per liter of washing water. The washing water had a hardness of 33° French degrees.

The machine had a circular front opening with a diameter of 22 cm, it was loaded with 4 kg of material to be washed, and it exhibited the additional characteristics below:

Its washing cycle made it possible to attain a temperature of 40° C. after 8 minutes of operation and a temperature of 80° C. after 40 minutes, with the temperature increasing thereafter to 85°–90° C.;

Its washing cycle lasted 70 minutes and was followed by a rinsing cycle and a drying cycle; and The agitation periods for the drum lasted 12 seconds and were separated by rest periods of 3 seconds.

In order to determine the activity of the various batch fractions, the foam heights at the opening were measured after 8 minutes, 30 minutes, 50 minutes and 70 minutes of the operation of each cycle. The results of these measurements are assembled in Table 3 below:

TABLE 3

| Batch fractions used immediately, i.e., new, and after storage for one month at 40° C., i.e., aged. | | Foam height in cm, measured after: | | | |
|---|---|---|---|---|---|
| | | 8 minutes | 30 minutes | 50 minutes | 70 minutes |
| Batch modified with $T_3$ | (new fraction) | 5 | 7 | 9 | 10 |
| | (aged fraction) | >22 | * | * | * |
| Batch modified with $T'_3$ | (new fraction) | 5 | 7 | 8 | 10 |
| | (aged fraction) | 5 | 6 | 8 | 9 |

*Since the foam overflowed after 10 minutes of operation, the washing cycle was interrupted.

These results show very clearly that it was necessary to introduce the anti-foaming agent $T_3$ into the washing powder in the form of the composition $T'_3$ since in this form the anti-foaming activity will not change with time.

EXAMPLE 4

10 parts of an α-ω-bis-(trimethylsiloxy)dimethylpolysiloxane oil $T_4$, of viscosity 12,500 cp. at 25° C., were mixed by malaxating for 15 minutes at about 30° C. with 165 parts of the fluid powder described in Example 1 (these 165 parts contained 90 parts of solid carrier $P_1$ of the general formula $(CH_3)(HO)_{0.04}SiO_{1.48}$ and 75 parts of water).

The mixture obtained was heated for 4 hours in an oven maintained at 110° C. At the end of this drying period, about 100 parts of anti-foaming composition $T'_4$ remained which had the appearance of a homogeneous granular powder.

4% of this composition $T'_4$ was incorporated into a batch of the washing powder described in Example 1 (this percentage corresponded to 0.4% of the oil $T_4$ and 3.6% of the carrier $P_1$) and 0.4% of the oil $T_4$ was incorporated into another batch.

Each batch was thus modified and stored, before use, for 1 month at 40° C. and was then introduced, at the rate of 10 g per liter of washing water, into the washing machine used in Example 3 (the washing water again had a hardness of 33° French degrees).

The foam heights at the opening were measured after 20 minutes, 40 minutes, 50 minutes, 60 minutes and 70 minutes of operation of each cycle. The results of the experiment have been assembled in Table 4 below:

TABLE 4

| | Foam height in cm measured after: | | | | |
|---|---|---|---|---|---|
| Batches used | 20 minutes | 40 minutes | 50 minutes | 60 minutes | 70 minutes |
| Batch modified with $T_4$ | 16 | 8 | >22 | >22 | >22 |
| Batch modified with $T'_4$ | 3 | 4 | 6 | 7 | 8 |

These results clearly show the advantage of dispersing the diorganopolysiloxane oil $T_4$ in the carrier $P_1$ prior to prolonged contact with the washing powder.

EXAMPLE 5

30 parts of a methylpolysiloxane liquid $T_5$ (of viscosity 105 cp. at 25° C. and consisting of $(CH_3)_3SiO_{0.5}$, $(CH_3)_2SiO$ and $CH_3SiO_{1.5}$ units distributed respectively according to the molar numerical ratio of 0.03:0.7:0.27) were mixed, by malaxating for 15 minutes at ambient temperature, with 127 parts of the fluid powder described in Example 1 (these 127 parts contained 70 parts of the solid carrier $P_1$ of the formula $CH_3(HO)_{0.04}SiO_{1.48}$ and 57 parts of water).

The mixture obtained was heated for 3 hours in an oven maintained at 110° C. After this heating period, about 100 parts of an anti-foaming composition $T'_5$ remained which had the appearance of a homogeneous granular powder.

1.33% of the composition $T'_5$ was incorporated into a batch of the washing powder described in Example 1 (this percentage corresponds to 0.4% of the liquid $T_5$ and 0.93% of the carrier $P_1$) and 0.4% of the liquid $T_5$ was incorporated in another batch.

Each modified batch was then divided into two fractions, one fraction was used immediately while the other was used after storage for 15 days at 60° C.

Each batch fraction was then introduced at the rate of 10 g per liter of washing water, into the washing machine used in Example 3. The washing water again had a hardness of 33° French degrees.

The foam height at the opening were measured after 20 minutes, 40 minutes, 50 minutes, 60 minutes and 70 minutes of operation of each cycle. The results of the measurements were assembled in Table 5 below:

TABLE 5

| Batch fractions used immediately, i.e., new, and after storage for 15 days at 60° C., i.e., aged. | | Foam height in cm, measured after: | | | | |
|---|---|---|---|---|---|---|
| | | 20 min-utes | 40 min-utes | 50 min-utes | 60 min-utes | 70 min-utes |
| Batch modified with $T_5$ | (new fraction) | 5 | 7 | 7 | 9 | 9 |
| | (aged fraction) | 17 | 8 | >22 | >22 | >22 |
| Batch modified with $T'_5$ | (new fraction) | 5 | 6 | 7 | 9 | 8 |
| | (aged fraction) | 4 | 7 | 7 | 8 | 9 |

The results show the advantage of dispersing the liquid $T_5$ in the carrier $P_1$ where it is to be stored together with the washing powder.

While there have been described and pointed out the fundamental novel features of the invention as applied to the preferred embodiments, those skilled in the art will appreciate that various modifications, changes and omissions in the composition of the anti-foaming compound as well as in the ways in which the compound may be used can be made without departing from the spirit of the invention. It is the intention, therefore, to be limited only by the scope of the claims which follow.

What is claimed is:

1. An organosilicon composition which contains:
   A. from about 2% to about 50% by weight of organosilicon anti-foaming agents, and
   B. from about 98% to about 50% of particulate solid carriers of the general formula $(CH_3)_a(HO)_b(RO)_cSiO_{(4-a-b-c)/2}$, in which the symbol "$R$" represents a methyl, ethyl, n-propyl, isopropyl, or n-butyl radical, the symbol "$a$" represents any number ranging from about 0.8 to about 1.1, the symbol "$b$" represents any number ranging from about 0.002 to about 0.2, and the symbol "$c$" represents any number ranging from about 0 to about 0.2,
   said composition containing no amino compounds, no alkali metal hydroxides and no alkaline earth metal hydroxides.

2. The composition according to claim 1, wherein the organosilicon anti-foaming agents of (A) are chosen from among the diorganopolysiloxane polymers corresponding to the formula $R'(R''_2SiO)_nSiR''_2R'$, in which the symbols R', which may be identical or different, represent hydroxyl radicals, alkoxy radicals having 1 to 4 carbon atoms, or methyl or vinyl radicals, the symbols R'', which may be identical or different, represent methyl, ethyl, n-propyl, vinyl or phenyl radicals, and at least about 80% of all the radicals represented by the symbols R' and R'' are methyl radicals, and the symbol "$n$" represents any number ranging from about 20 to about 10,000.

3. The composition according to claim 2, wherein the diorganopolysiloxane polymer anti-foaming agents are mixed with finely divided silicas of specific surface area greater than 80 m²/g, this mixture containing, at the most, about 20% of finely divided silicas.

4. The composition according to claim 2, in that the anti-foaming agent (A) is a dimethylpolysiloxane polymer.

5. The composition according to claim 1, wherein the organosilicon anti-foaming agents (A) are chosen from among the methylpolysiloxane liquid polymers which have from about 1.6 to about 1.98 methyl radicals per silicon atom and which are composed of a combination of units chosen from the group thereof having the formulae: $(CH_3)_3SiO_{0.5}$, $(CH_3)_2SiO$ and $CH_3SiO_{1.5}$.

6. The composition according to claim 1, wherein the solid carriers of (B) are chosen such that the symbol "$a$" represents any number ranging from about 0.85 to about 1.05, the symbol "$b$" represents any number ranging from about 0.003 to about 0.15, and the symbol "$c$" represents any number ranging from about 0 to about 0.15.

7. An article of manufacture comprising as a unit, an intimately admixed and packaged amount of (1) the composition defined by claim 1, and (2) a detergent; said mixture being confiningly enclosed within a packaging means.

8. An aqueous dispersion containing the composition of claim 1.

9. An organosilicon composition which consists essentially of:
   A. from about 2% to about 50% by weight of organosilicon anti-foaming agents, and p1 B. from about 98% to about 50% of particulate solid carriers of the general formula $(CH_3)_a(HO)_b(RO)_cSiO_{(4-a-b-c)/2}$, in which the symbol "$R$" represents a methyl, ethyl, n-propyl, isopropyl, or n-butyl radical, the symbol "$a$" represents any number ranging from about 0.8 to about 1.1, the symbol "$b$" represents any number ranging from about 0.002 to about 0.2, and the symbol "$c$" represents any number ranging from about 0 to about 0.2.

10. A method of limiting the foaming properties of a liquid comprising adding a composition to the liquid, said composition comprising:
    A. from about 2% to about 50% by weight of organosilicon anti-foaming agents, and
    B. from about 98% to about 50% of particulate solid carriers of the general formula $(CH_3)_a(HO)_b(RO)_cSiO_{(4-a-b-c)/2}$, in which the symbol "$R$" represents a methyl, ethyl, n-propyl, isopropyl, or n-butyl radical, the symbol "$a$" represents any number ranging from about 0.8 to about 1.1, the symbol "$b$" represents any number ranging from about 0.002 to about 0.2, and the symbol "$c$" represents any number ranging from about 0 to about 0.2,
    said composition containing no amino compounds, no alkali metal hydroxides and no alkaline earth metal hydroxides.

11. A composition which comprises a powdered detergent in admixture with a composition comprising:
    A. from about 2% to about 50% by weight of organosilicon anti-foaming agents, and
    B. from about 98% to sbout 50% of particulate solid carriers of the general formula $(CH_3)_a(HO)_b(RO)_cSiO_{(4-a-b-c)/2}$, in which the symbol "$R$" represents a methyl, ethyl, n-propyl, isopropyl, or n-butyl radical, the symbol "$a$" represents any number ranging from about 0.8 to about 1.1, the symbol "$b$" represents any number ranging from about 0.002 to about 0.2, and the symbol "c" represents any number ranging from about 0 to about 0.2.

12. The composition of claim 11, wherein said detergent contains about 5 to about 25% of one or more surfactants of the group comprising sodium alkyl sulphates, mixed potassium alkyl sulphates, sodium alkylarylsulphonates, potassium alkylarylsulphonates, the condensation products of alkylphenols, with ethylene oxide, the condensation products of fatty alcohols with ethylene oxide and alkali metal salts of fatty acids, the remainder of said detergent comprising one or more inorganic products from the group comprising phosphates, tripolyphosphates, hexametaphosphates, silicates, sulphates, perborates, carbonates and bicarbonates of sodium or potassium.

* * * * *